Sept. 10, 1957 A. C. LUTHER, JR 2,806,176

DEFLECTION CIRCUIT

Filed Dec. 31, 1953 2 Sheets-Sheet 1

INVENTOR.
Arch. C. Luther, Jr.
BY
ATTORNEY

INVENTOR.
Arch C. Luther, Jr.
BY [signature]
ATTORNEY.

2,806,176

DEFLECTION CIRCUIT

Arch C. Luther, Jr., Merchantville, N. J., assignor to Radio Corporation of America, a corporation of Delaware Application December 31, 1953, Serial No. 401,676

3 Claims. (Cl. 315—27)

This invention relates to television systems and more particularly to circuits for obtaining linear deflection of an electron beam in a cathode ray tube.

In present television practice, the image in a cathode ray tube is scanned by an electron beam which traces successive lines of a raster. In a television camera, an optical image is focused upon a photo-sensitive screen to form an electronic image on a target area, and a modulated video signal results from an electron beam which traces a raster upon the target area. In a television receiver, the modulated video signal is used to control the intensity of an electron beam which scans a raster on a fluorescent screen thereby reproducing the image. The raster traced in the kinescope of the television receiver must have the same configuration as that traced in the camera tube of the television transmitter. The circuitry necessary for deflecting the electron beam to scan these rasters may be the same or similar in both the camera and the receiver.

To accomplish the deflection of an electron beam, a deflection yoke winding mounted about the neck of the cathode ray tube is excited by sawtooth waves of current which produces a varying magnetic field in the path of the electron beam. The sawtooth deflection wave is generated by a relaxation oscillator which may be "locked-in" to a source of scanning synchronizing pulses and caused to operate in synchronism with the pulse source. The output of the relaxation oscillator is a sawtooth voltage wave. Since it is necessary to supply the deflection yoke windings with a sawtooth wave of current, it is necessary to couple the deflection yoke to the relaxation oscillator by means of an amplifier. It is desirable that this amplifier have a low impedance output circuit to properly match the impedance of the deflection yoke. On the other hand, this amplifier should have a high impedance input so that the relaxation oscillator will not be unduly loaded and caused to yield a non-linear waveform. The relaxation oscillator should likewise have a high impedance input so the source of synchronizing pulses will not be unduly loaded.

It is an object of this invention to provide an improved television deflection system which is suitable for use with either a television camera or a television receiver.

A further object of this invention is to provide a television deflection system which is simplified and economical to manufacture.

A further object of this invention is to provide a deflection circuit which may furnish deflection waves to a low impedance deflection yoke winding, and which will have a high impedance input for connection to a synchronizing signal pulse source.

According to this invention, the deflection circuit comprises a relaxation oscillator coupled to a cathode-follower amplifying stage. A feedback path is used to obtain good sawtooth linearity. Because the output of the cathode-follower stage presents a low impedance to its load, it will be suitably matched to the deflection yoke winding which may be transformer-coupled to or directly driven by the cathode-follower.

Other objects of this invention will become apparent upon a reading of the following specification and an inspection of the accompanying drawing in which.

In the various figures of the drawing similar elements are designated by the same numeral.

Figures 1, 2:
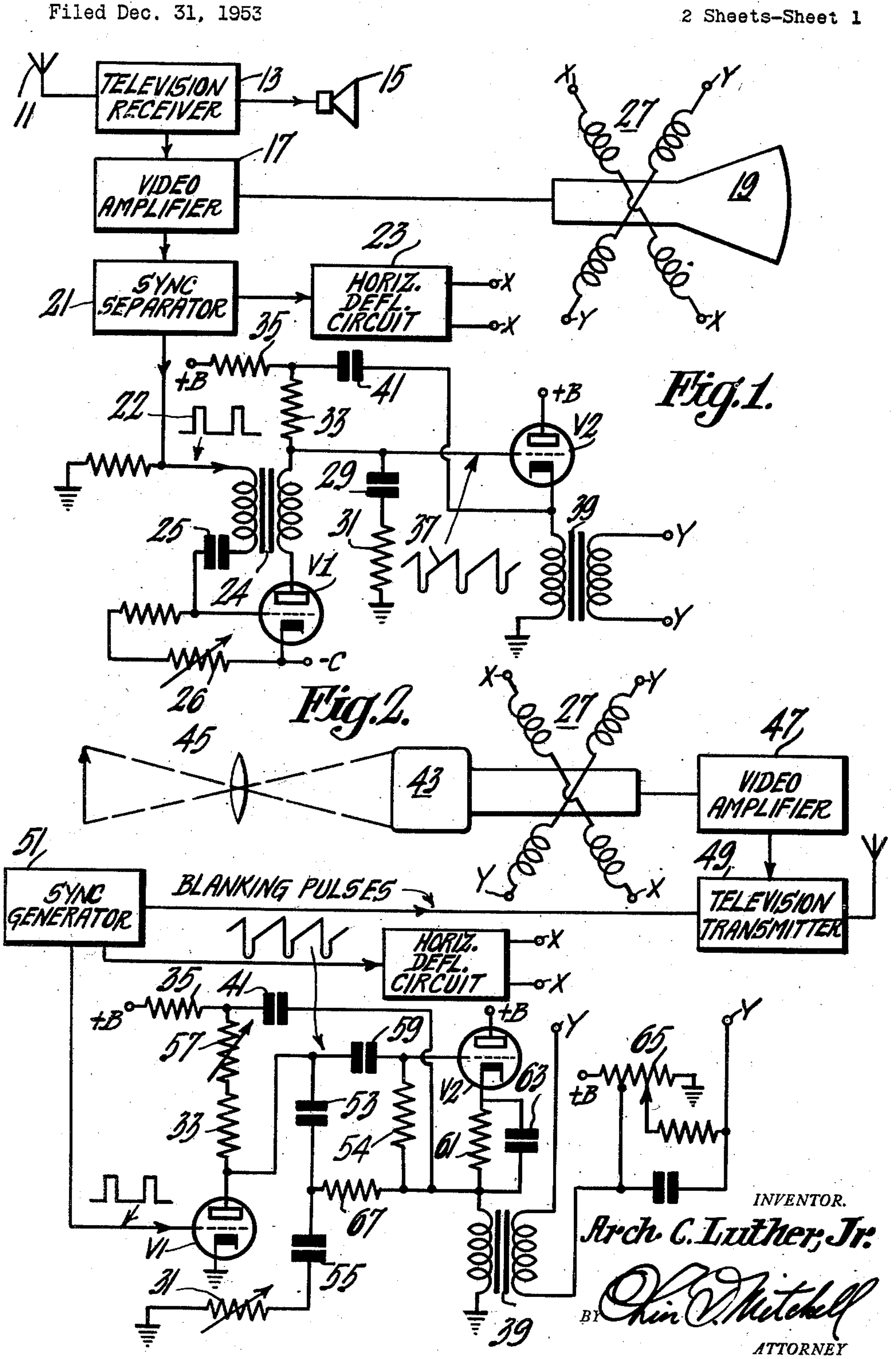
Figure 1 shows by block diagram a television receiving circuit which includes by circuit diagram one form of a simplified deflection circuit made in accordance with the teachings of this invention.
Figure 2 illustrates by block and circuit diagram a television transmitting circuit including one form of deflection circuit as it may be used with an image orthicon in a television camera.

Referring to Figure 1 in more detail, there is seen the circuit for a television receiver involving one form of this invention. Incoming video signals are received by the antenna 11 and the television receiver 13 which includes a radio frequency section, a converter section, a local oscillator section and an intermediate frequency amplifier. A sound channel is indicated by the speaker symbol 15. A video amplifier 17 furnishes a modulated video signal to the cathode ray tube or kinescope 19 and synchronizing signals to the synchronizing signal separator 21. The synchronizing signal furnishes synchronizing pulses to the horizontal deflection circuit 23 and to a vertical deflection circuit which is shown schematically. A deflection yoke 27 is fitted around the neck of the cathode ray tube 19 and receives deflection waves of current from the horizontal deflection circuit 23 and the vertical deflection circuit by connections at X—X and Y—Y. The elements referred to above may take the form presently employed in commercially available television receivers. One such television receiver is described in the "RCA Review" for March 1947 beginning at page 58.

Vertical synchronizing pulses 22 from the synchronizing signal separator are applied to a blocking oscillator which includes an electron discharge tube V1. The control electrode of this tube is coupled to the anode circuit by a transformer 24 and a coupling capacitor 25. The frequency of this oscillator may be varied by varying the grid resistor 26 which constitutes a vertical hold control. When the frequency is adjusted to a value equal to or slightly less than that of the synchronizing pulses 22, the oscillator will "lock in" with the incoming synchronizing signal.

Triode V1 is normally cut off during which time a capacitor 29 is slowly charged by a B+ voltage which is applied through a series resistance including resistors 31, 33 and 35. During the pulse interval, the discharge tube V1 conducts and the capacitor 29 is abruptly discharged. A sawtooth deflection wave of voltage 37 is generated as a result of the gradual charging and the abrupt discharging of capacitor 29. This sawtooth wave is applied to the grid of a cathode follower triode V2. The output of the cathode follower is coupled to the yoke windings 27 by a transformer 39. Capacitor 41 provides a positive feedback path from the cathode output of triode V2 to the sawtooth wave generating output of the discharge tube V1. This positive feedback path serves to improve linearity of the generated sawtooth voltage.

It is sometimes difficult to obtain good low frequency response in a deflection circuit employing transformer coupling between the deflection yoke and the sawtooth wave generator. If the proper low frequency voltage wave shape can be obtained in the primary of the transformer, a secondary voltage will be essentially the same shape. Therefore, driving a transformer with a cathode follower will produce an extended low frequency response because the low output impedance of the cathode follower insures that the proper voltage will be maintained across the transformer primary even though the magnetizing inductance draws a large proportion of the current from the circuit. Consequently, a good voltage waveform can be impressed upon the grid of the cathode follower and the yoke will have a corresponding linear sawtooth current flow.

In Figure 2, an image is focused upon an image orthicon camera tube 43 by an optical system 45. The deflection yoke windings 27 cause an electron beam to scan the image. A modulated video signal is thereby obtained. This modulated video signal is amplified by a video amplifier 47 and is transmitted by a television transmitter 49. A synchronizing signal pulse generator 51 generates horizontal and vertical blanking pulses for the transmitter and synchronizing pulses to key the horizontal and vertical deflection circuits. Details concerning the elements of the television transmission system referred to above may be found well described in the published art. Television transmitting equipment is described in the book entitled, "Principles of Television Engineering" by Fink published by the McGraw Hill Book Co., Inc.

The vertical deflection circuit functions in a manner similar to that of the circuit shown in Figure 1. Capacitors 53 and 55 are charged slowly through a resistive circuit comprising resistors 31, 33, 35, and 57 and discharged abruptly through the discharge tube V1. The sawtooth wave thereby generated is impressed upon the grid of the cathode follower V2 by the capacitive coupling 59. Positive feedback is provided through capacitor 41. Resistor 61, resistor 54 and capacitor 63 are used to bias the cathode follower V2. Resistor 57 is made adjustable in this circuit to provide a size control for the scanned raster. A centering adjustment for the raster is provided by the potential dividing resistor 65 which permits direct current to flow through the yoke windings.

Second order compensation has been introduced into this circuit to correct for the fact that the cathode follower output stage has a gain less than unity. A resistor 67 is a compensating element to return the cathode biased voltage to a center tap of the discharge capacitors 53 and 55.

This circuit is particularly advantageous in a color television camera where it is desired to drive 3 yoke windings in parallel. Since this circuit with its low impedance presents a well regulated voltage output, the currents in the 3 yokes can be individually adjusted with practically no interaction. This is not a characteristic of the current-regulating circuits which are presently commonly employed in television cameras.

Figure 3:
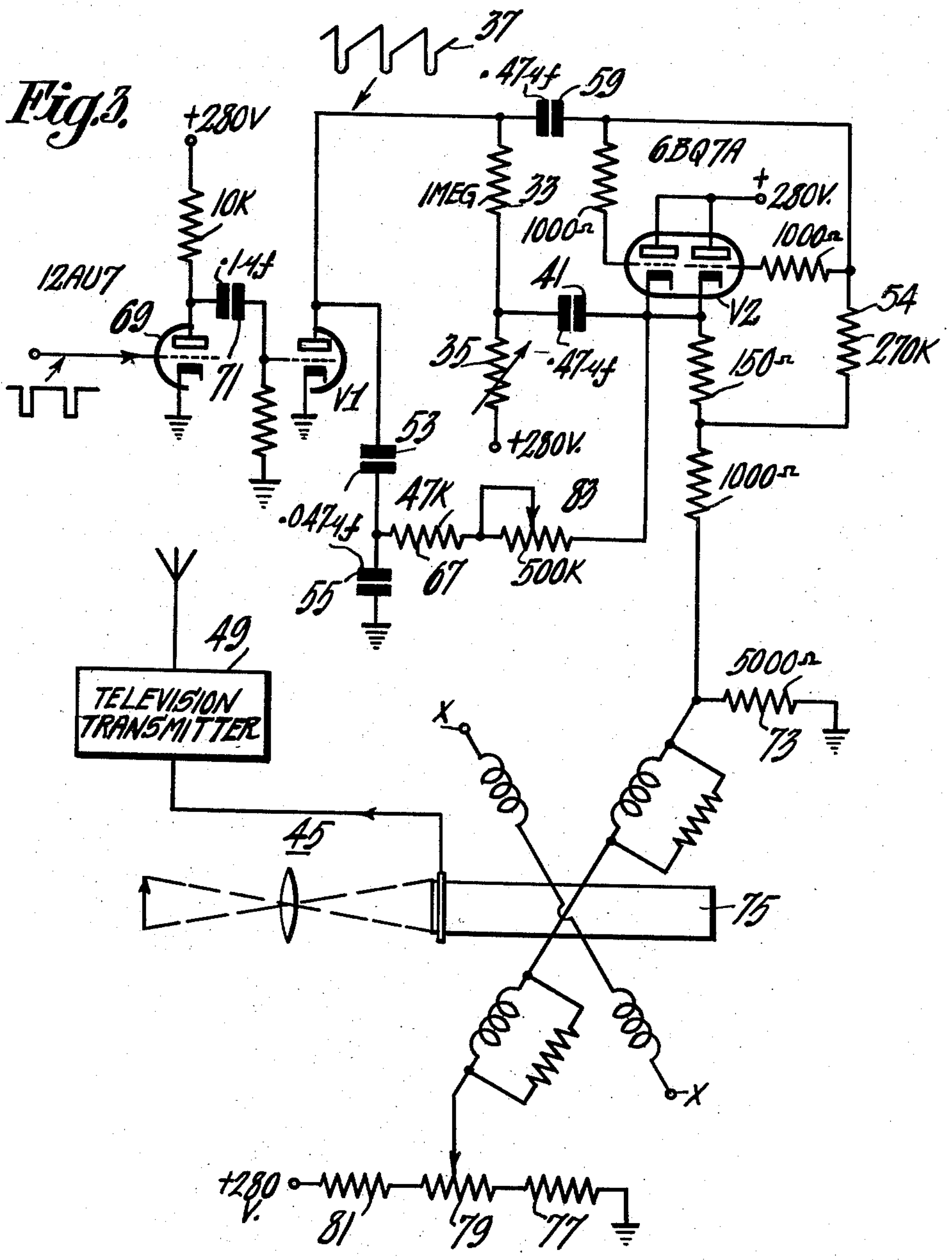
Figure 3 shows by circuit diagram a deflection circuit involving the teachings of this invention for use with a vidicon television camera tube.

This invention has been adapted for deflection of the electron beam in the vidicon camera as shown by Figure 3. In the circuit shown in Figure 3, negative synchronizing pulses are impressed upon the grid of a triode 69 which amplifies the synchronizing pulses and reverses their phase. The positive pulses appearing at the plate of triode 69 are coupled to the grid of the discharge tube V1 by capacitor 71. In the embodiment of the invention shown in Figure 3, the triodes 69 and V1 have been enclosed within the same evacuated envelope.

Sawtooth deflection waves of voltage are developed by the slow charging and abrupt discharging of capacitors 53 and 55. The charging circuit includes resistors 33 and 35 which couple the charging capacitors to the B+ voltage. The discharging circuit for capacitors 53 and 55 is a path to ground through the triode V1.

The cathode follower tube V2 is likewise a twin triode, but in the form of the invention illustrated, the triode elements are connected in parallel to increase the power capacity of the tube. Resistor 73 forms the load impedance of the cathode follower V2 and the vertical deflection yoke windings are coupled to the cathode follower in shunt with resistor 73. In the embodiment of the invention illustrated, the sawtooth wave is used to deflect the electron beam in a vidicon tube 75. The modulated video signal is taken from the vidicon tube 75 by the television transmitter 49 wherein a composite video and synchronizing signal is developed and transmitted. The resistive network which includes resistors 77, 79 and 81 furnishes an adjustable direct current for the centering of the raster in the vidicon.

The feedback path comprises a capacitor 41 which increases the linearity of the generated sawtooth wave. A further compensating feedback path comprises resistors 67 and 83 which return the cathode biased voltage to a center tap of the discharge capacitors 53 and 55.

The deflection circuits built in accordance with the teachings of this invention are particularly adaptable to color television systems. In color television systems, it is desirable to drive three separate deflection yoke windings in parallel. Since the deflection circuits described present essentially a voltage source output with a low impedance to the connected loads, each individual load can be adjusted with practically no interaction with the other loads.

What is claimed is:

1. A system for deflecting an electron beam in a television image translating device, including a cathode follower electron discharge device having cathode, grid and anode electrodes, a low impedance circuit comprising a resistance device and a device having a resistive component connected between said cathode electrode and a point of fixed potential, means to couple deflection system windings to said device having a resistive component, a first resistor and a second resistor and a first capacitor and a second capacitor connected in series in the order named between a point of fixed positive potential and a point of fixed reference potential, a pulse translating tube having a cathode, a grid and an anode, the anode being coupled to the junction between a resistor and a capacitor, a capacitor connecting the junction of said first and second resistors to a terminal of the resistance device connected to the cathode of said discharge device, another capacitor connecting the junction of a resistor and a capacitor of said series circuit to the grid electrode of said discharge device, a resistor connected between the junction of said first and second capacitors and a terminal of the resistance device connected to said cathode electrode, and a further resistor connecting the grid electrode and a point on said resistance device connected to said cathode electrode.

2. A system for deflecting an electron beam in a television image reproducing device, including a cathode follower electron discharge device having cathode, grid and anode electrodes, a low impedance circuit comprising a cathode resistor and the primary winding of a transformer connected between said cathode electrode and a point of fixed reference potential, a secondary winding on said transformer to couple deflection system windings to said primary winding, a first resistor and a second resistor and a first capacitor and a second capacitor and a resistive device connected in series in the order named between said point of fixed positive potential and a point of fixed reference potential, a pulse translating tube having a cathode, a grid and an anode, the anode being coupled to the junction between a resistor and a capacitor, a capacitor connecting the junction of said resistors to the terminal of said first and second cathode resistor remote from the cathode of said discharge device, another capacitor connecting said junction of a resistor and a capacitor of said series circuit to the grid electrode of said discharge device, a resistor connecting the junction between said capacitors to said terminal of the cathode resistor remote from said first and second cathode electrode, and a further resistor connecting the grid electrode to the terminal of the cathode resistor remote from said cathode electrode.

3. A system for deflecting an electron beam in a television image scanning device, including a cathode follower electron discharge device having cathode, grid and anode electrodes, a low impedance circuit comprising a first resistor, a second resistor and a third resistor connected in series in the order named between said cathode electrode and a point of fixed reference potential, means to couple deflection system windings across said third resistor, a fourth resistor and a fifth resistor and a first capacitor and a second capacitor connected in series in the order named between a point of fixed positive potential and said point of fixed reference potential, a pulse translating tube having a cathode, a grid and an anode, the anode being coupled to the junction between said fifth resistor and said first capacitor, a capacitor connecting the junction of said fourth and fifth resistors to the cathode of said discharge device, another capacitor connecting said junction between said fifth resistor and said first capacitor to the grid electrode of said discharge device, a resistor connecting the junction of said first and second capacitors to said cathode electrode, and a further resistor connecting the grid electrode to the junction of said first and second resistors.

References Cited in the file of this patent

UNITED STATES PATENTS

| | | |
|---|---|---|
| 2,248,975 | Faudell | July 15, 1941 |
| 2,482,150 | Bocciarelli | Sept. 20, 1949 |
| 2,536,853 | Moore et al. | Jan. 2, 1951 |